(12) United States Patent
West

(10) Patent No.: US 10,207,708 B2
(45) Date of Patent: *Feb. 19, 2019

(54) SYSTEM AND METHOD FOR MINIMIZING SHIFT CYCLING FOR ENGINE OPERATION USING CRUISE CONTROL

(71) Applicant: Allison Transmission Inc., Indianapolis, IN (US)

(72) Inventor: Stephen West, New Palestine, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,270

(22) Filed: Dec. 28, 2017

(65) Prior Publication Data

US 2018/0134293 A1    May 17, 2018

Related U.S. Application Data

(63) Continuation of application No. 14/744,904, filed on Jun. 19, 2015, now Pat. No. 9,896,099.

(51) Int. Cl.
*B60W 30/14* (2006.01)
*B60W 50/06* (2006.01)

(52) U.S. Cl.
CPC .......... *B60W 30/143* (2013.01); *B60W 50/06* (2013.01); *B60K 2310/244* (2013.01); *B60W 2720/10* (2013.01)

(58) Field of Classification Search
CPC .. B60W 30/143; B60W 30/146; B60W 50/06; B60W 2720/10; B60W 30/14; B60K 2310/244
See application file for complete search history.

(56) References Cited

U.S. PATENT DOCUMENTS 4,982,805 A    1/1991 Naitou et al.
5,012,419 A    4/1991 Yamamoto
(Continued)

FOREIGN PATENT DOCUMENTS

EP    2566735 B1    1/2015

OTHER PUBLICATIONS

Korean Intellectual Property Office; International Search Report and Written Opinion of the International Searching Authority issued in PCT/US2015/036780; dated Mar. 2, 2016; 9 pages.

*Primary Examiner* — Huan Le
(74) *Attorney, Agent, or Firm* — Taft Stettinius & Hollister LLP; Stephen F. Rost

(57) ABSTRACT

A system and method for minimizing shift cycling for low speed engine operation with a vehicle cruise control. A vehicle control system operating in a cruise control mode determines a deficiency in vehicle speed between a measured vehicle speed and a cruise set speed. The deficiency is determined by comparing the vehicle speed to the cruise set speed, and includes using the compared value to find a cruise speed margin, which is continuously updated. While the cruise control system is active, the control system logic determines the time at which a transmission upshift occurs based on the cruise speed margin. The vehicle speed, at which the upshift is made, is determined as a function of the updated cruise speed margin. An upshift is not made, if a likely drop in vehicle speed would result in the event a downshift would occur once the upshift is made.

19 Claims, 6 Drawing Sheets

(56) References Cited

U.S. PATENT DOCUMENTS

| | | |
|---|---|---|
| 6,202,780 B1 | 3/2001 | Tanaka et al. |
| 9,896,099 B2 * | 2/2018 | West .................... B60W 30/143 |
| 2002/0006850 A1 | 1/2002 | Takao et al. |
| 2011/0166754 A1 * | 7/2011 | Kolk ..................... B60W 10/04 |
| | | 701/54 |
| 2011/0238272 A1 * | 9/2011 | Kato ..................... B60W 10/06 |
| | | 701/55 |
| 2013/0102438 A1 | 4/2013 | Kellum et al. |
| 2014/0163798 A1 | 6/2014 | Ross |

* cited by examiner

SYSTEM AND METHOD FOR MINIMIZING SHIFT CYCLING FOR ENGINE OPERATION USING CRUISE CONTROL

CROSS-REFERENCE TO RELATED APPLICATION

This application is a continuation application of U.S. patent application Ser. No. 14/744,904, filed Jun. 19, 2015, having the title "System and Method for Minimizing Shift Cycling for Engine Operation Using Cruise Control", which is hereby incorporated by reference in its entirety.

FIELD OF THE DISCLOSURE

The present disclosure relates to a motor vehicle having a multiple speed transmission, and in particular to a system and method for shifting gears of the multiple speed transmission during a vehicle cruise control operation.

BACKGROUND

The majority of vehicles produced today include a cruise control system, or speed control system, which automatically controls the speed of a motor vehicle when operating in a cruise control mode. The cruise control speed is set by an operator of the vehicle to establish a vehicle speed preferred by the operator. The cruise control has been found particularly useful on long trips for improving the driver's experience by reducing driver fatigue resulting from extended physical or mental exertion. In addition, operating the vehicle in cruise control often reduces vehicle operating costs, since an engine operating under control of the cruise control system can achieve better fuel mileage.

Gear selection in an automatic transmission when paired with an engine operating in a cruise control mode, however, can be challenging. In many cruise control systems, the control system often selects a gear that places the engine at a relatively low speed for fuel efficiency purposes. However, known cruise control algorithms reacting to variations in road conditions can result in the vehicle speed exhibiting oscillatory behaviour about the cruise set speed. These oscillations can trigger gear shifts, especially when the cruise control system is operating the vehicle at a low engine speed. When operating at a low engine speed, the transmission downshifts to a lower gear to avoid operating the engine below a minimum speed. Consequently, even though the cruise control system can maintain the vehicle speed at a value close to the desired speed, the vehicle experiences a high frequency of gear shifts. The increased frequency can be unacceptable resulting in excessive transmission wear and driver aggravation.

SUMMARY

A system and method for minimizing shift cycling for engine operation using cruise control monitors the cruise set speed and determines when the vehicle speed deviates from the cruise set speed. In one embodiment, the system determines when the vehicle speed varies with, and in particular, falls below the cruise set speed when the engine is not torque limited. The determined variation is used to raise an engine speed threshold, or equivalently the transmission turbine speed threshold, at which an upshift occurs and thus minimizes shift cycling.

A method for determining the required engine speed margin includes monitoring the state of cruise control system to determine whether the vehicle is operating in a cruise control mode or not. If the vehicle is operating in the cruise control mode, the cruise control set speed is monitored. In one embodiment, the set speed is determined by a transmission output speed sensor which determines the speed of the transmission output shaft which corresponds to wheel speed, and therefore vehicle speed. When the cruise control is activated, the vehicle speed is monitored to determine whether the vehicle speed is within a variable threshold determined with respect the cruise set speed. The variable threshold, in one embodiment, is used to by the transmission to determine when a change from one gear to another gear should be made upon engagement of activation of the cruise control.

As long as the engine is not operating at an engine steady state torque limit, the determined vehicle speed is initially monitored relative to the cruise control set speed and, in particular, to a predetermined threshold, which in different embodiments is zero or some other value. Whenever the difference between the vehicle set speed and vehicle speed is greater than the predetermined threshold for the first time, a cruise speed margin is determined which is equivalent to the vehicle speed in excess of the predetermined threshold. The cruise speed margin is saved and used to control the gears shift made by the transmission. The determined vehicle speed continues to be monitored with respect to the cruise speed margin. In one embodiment, the determined vehicle speed is compared to the predetermined threshold plus the cruise speed margin. If the vehicle speed does not exceed the sum of the predetermined threshold and the cruise speed margin once the sum of the two has been calculated, the cruise speed margin is made to gradually decay to zero until it reaches the predetermined threshold. If, the vehicle speed, however, is greater than the sum of the predetermined threshold value plus the cruise speed margin, the cruise speed margin is set to a new value. As before, if the vehicle speed does not exceed the sum of the predetermined threshold and the cruise speed margin, the cruise speed margin is made to gradually decay to the predetermined value. If, however, the vehicle speed is greater than the continuously updated sum of predetermined threshold and cruise speed margin at any time during the decay of the cruise speed margin, the cruise speed margin is reset to a new value. In this way, the cruise speed margin is a measure of the maximum vehicle speed variation seen over a time.

In one embodiment, there is provided a vehicle speed control method for controlling the speed of a vehicle including a cruise control system and an engine developing an engine torque to drive a transmission having a lower gear and a higher gear and configured to move the vehicle in response to the engine torque. The method includes: i) detecting if the vehicle is operating with a cruise set speed maintained by the cruise control system; ii) detecting when the vehicle speed is less than the cruise set speed, if the vehicle is operating with the cruise control set speed; iii) determining a cruise margin from a comparison of the vehicle speed to the cruise set speed, if the detected vehicle speed is less than the cruise set speed; iv) modifying the cruise margin over a period of time; v) shifting from a lower gear to a higher gear if the vehicle speed is greater than the modified cruise margin; and vi) not shifting from the lower gear to a higher gear if the vehicle speed is less than the modified cruise margin.

In another embodiment, there is provided a vehicle speed control method for controlling the speed of a vehicle including a cruise control system and an engine developing an engine torque to drive a transmission having a lower gear and a higher gear. The method includes: i) generating a first cruise margin when a vehicle speed is less than a cruise control set speed; ii) generating a second cruise margin when a difference between the cruise set speed and the vehicle speed is greater than the first cruise margin; iii) decreasing the value of the second cruise margin over time until the second cruise margin is equal to a predetermined cruise margin.

In another embodiment, there is provided a vehicle control system configured to control a vehicle speed of a vehicle including a cruise control system configured to provide a cruise set speed, an engine developing an engine torque to drive a transmission having a lower gear and a higher gear and configured to move the vehicle in response to the engine torque. The vehicle includes a memory configured to store program instructions and a vehicle system controller operably connected to the transmission and to the memory. The vehicle system controller is configured to execute the stored program instructions to: i) generate a first cruise margin when the vehicle speed is less than the cruise set speed; ii) generate a second cruise margin when a difference between the cruise set speed and the vehicle speed is greater than the first cruise margin; iii) modify the second cruise margin over time; and iv) control a shift from one of the lower gear and the higher gear to the other of the lower gear and the higher gear based on the modified second cruise margin.

In a further embodiment, there is provided a vehicle speed control method for controlling a speed of a vehicle including a cruise control system and an engine developing an engine torque to drive a transmission having a plurality of gears, wherein the transmission is configured to upshift from a lower gear to a higher gear having a lower RPM than an RPM of the lower gear, is configured to downshift from the higher gear to the lower gear having a higher RPM than the RPM of the higher gear, and is configured to move the vehicle in response to the engine torque. The method includes: identifying a cruise set speed maintained by the cruise control system; identifying when the vehicle speed is less than the cruise set speed; determining a cruise margin from a comparison of the identified vehicle speed to the identified cruise set speed; and modifying the cruise margin over a period of time by continuously increasing the cruise margin until the vehicle speed falls below a downshift threshold.

In still another embodiment, there is provided a vehicle control system configured to control a vehicle speed of a vehicle including a cruise control system configured to provide a cruise set speed, an engine developing an engine torque to drive a transmission having a plurality of gears, wherein the transmission is configured to upshift from a lower gear to a higher gear having a lower RPM than an RPM of the lower gear, is configured to downshift from the higher gear to the lower gear having a higher RPM than the RPM of the higher gear, and is configured to move the vehicle in response to the engine torque. The vehicle control system includes a memory device configured to store program instructions, and a vehicle system control module operably connected to the transmission and to the memory device. The vehicle system control module is configured to execute the stored program instructions to: identify a cruise set speed maintained by the cruise control system; identify when the vehicle speed is less than the cruise set speed; determine a cruise margin from a comparison of the vehicle speed to the cruise set speed; and modify the cruise margin over a period of time by continuously increasing the cruise margin until the vehicle speed falls below a downshift threshold.

In an additional embodiment, there is provide a method for minimizing shift cycling for an engine operation of a vehicle having a cruise control system that monitors a vehicle speed and a cruise set speed, and determines when the vehicle speed deviates from the cruise set speed. The method includes: determining an upshift speed threshold wherein an upshift from a lower gear to a higher gear occurs; determining a cruise margin when the vehicle speed falls below the cruise set speed and when the engine is not operating in a torque limited mode; and raising the upshift speed threshold and thus minimizing shift cycling.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
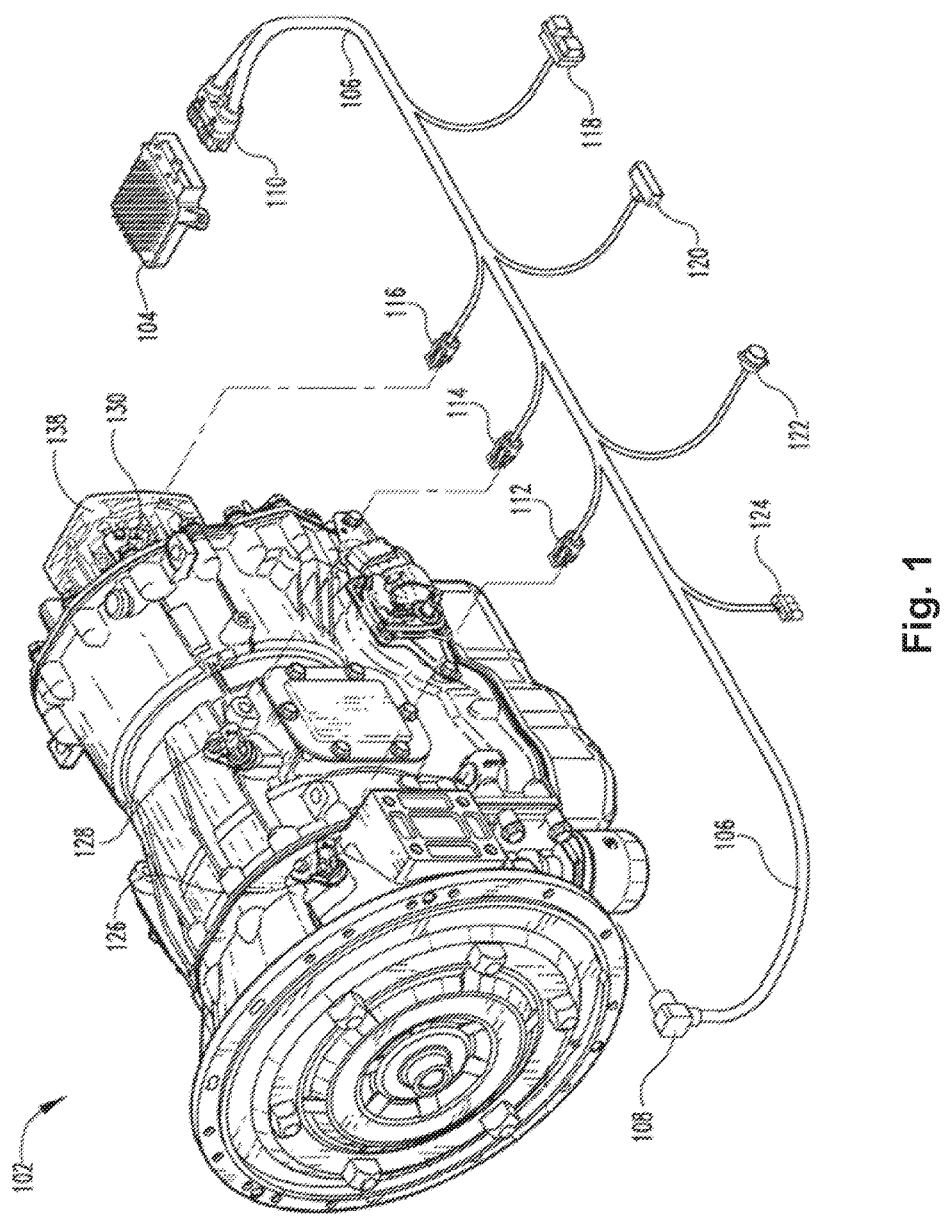
FIG. 1 is an exemplary embodiment of a transmission assembly.

The present disclosure relates to a vehicle operating in a cruise control mode having a transmission controlled for minimizing shift cycling. With reference to FIG. 1, an exemplary embodiment of a transmission assembly is provided. A transmission 102 is shown in FIG. 1 with a controller 104, i.e., transmission control module ("TCM"). Software is downloaded to the TCM 104 and a wiring harness 106 couples the TCM 104 to the transmission 102. In other embodiments the TCM is preprogrammed. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1 for example, an engine or input speed sensor connector 112 couples to an engine or input speed sensor 126 of the transmission 102. Likewise, in an embodiment in which a torque converter is present, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a data bus connector 120, a throttle position sensor (TPS) 124, a vehicle connector 118 (e.g., Vehicle Interface Module ("VIM") connector), and an alternative transmission harness mating connector 122. There can be additional connectors and/or harnesses in other embodiments.

As noted, the transmission 102 can include the engine or input speed sensor 126, turbine speed sensor 128, and output speed sensor 130. In this embodiment, the transmission 102 mounts to an engine (not shown). In one embodiment, an internal combustion engine (not shown) is coupled to the transmission 102 via a torque converter 132 (or input shaft for those embodiments without a torque converter). The internal combustion engine is configured to rotatably drive an output shaft (not shown) of the engine that is coupled to the input (not shown) of the torque converter 132. The torque converter 132 further includes a turbine (not shown) that is coupled via splines to a turbine shaft (not shown) of the transmission 102. In turn, the turbine shaft (not shown) is coupled to, or integral with, a rotatable input shaft (not shown) of the transmission 102. An output shaft (not shown) of the transmission 102 is coupled to or is integral with, and rotatably drives, a propeller shaft (not shown) that is coupled to a conventional universal joint (not shown). The universal joint (not shown) is coupled to and rotatably drives a drive axle (not shown) having tires or wheels mounted thereto at each end. The output shaft (not shown) of the transmission 102 drives the tires in a conventional manner via the propeller shaft, universal joint and drive axle.

During operation, as the engine rotatably drives the torque converter 132, the engine or input speed sensor 126 detects the rotational speed of the torque converter 132. The torque converter 132, in different embodiments, includes ribs or protrusions (not shown) that protrude from the surface of the torque converter 132 and which the engine or input speed sensor 126 measures during each revolution.

The transmission 102, in different embodiments, includes an output shaft (not shown) which is enclosed by a rear cover 138 of the transmission 102. To measure the output speed of the transmission 102, the output speed sensor 130 is coupled to the rear cover 138. In other embodiments, the output speed sensor 130 is alternatively located. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft.

Transmission shift schedules and other related instructions are included in software which is downloaded to the TCM 104. In other embodiments, the TCM 104 is preprogrammed. The TCM 104 controls the shifting of the transmission by electrically transferring instructions to the transmission such that certain actions are carried out by the synchronizers, brakes, clutches, dog clutches, pistons, etc. In one non-limiting embodiment, the TCM 104 is part of a transmission control circuit that can further include an electronic solenoid and valve assembly for controlling the engaging and disengaging of clutch assemblies, etc. Components within the transmission 102 are activated electrically, mechanically, hydraulically, pneumatically, automatically, semi-automatically, and/or manually. The transmission control circuit is able to control the operation of the transmission to achieve desired performance.

Based on instructions in a transmission software program, the transmission control circuit (e.g., TCM 104) determines a shift schedule depending on a vehicle's driving condition and executes instructions contained in the software by sending signals through the wiring harness 106 to control the transmission 102. The TCM 104, in different embodiments, also receives measurement data from the transmission 102 such as, for example, input speed from the input speed sensor 126, turbine speed from the turbine speed sensor 128, and output speed from the output speed sensor 130. In an embodiment in which the transmission does not include a torque converter, the transmission may only have an input speed sensor 126 and output speed sensor 130. The TCM 104, in different embodiments, also calculates various parameters including transmission gear ratios or ranges, which depend on the ratio of input speed to output speed.

The TCM 104, in different embodiments, receives accelerator pedal position (i.e., throttle percentage) from a throttle input source, which, in different embodiments, is coupled to an engine control module (ECM) or vehicle control module (VCM) for transmitting throttle data over a data bus. Examples of a conventional data bus include J1708 data bus, J1939 data bus, IESCAN data bus, GMLAN, Mercedes PT-CAN, In addition, a Hardwire TPS (throttle position sensor) to TCM or Hardwire PWM (pulse width modulation) to TCM can be used. Information such as accelerator pedal position that is communicated over the data bus is not limited to a particular engine/transmission configuration. Instead, the data bus can be adapted to most vehicle setups.

Figure 2:
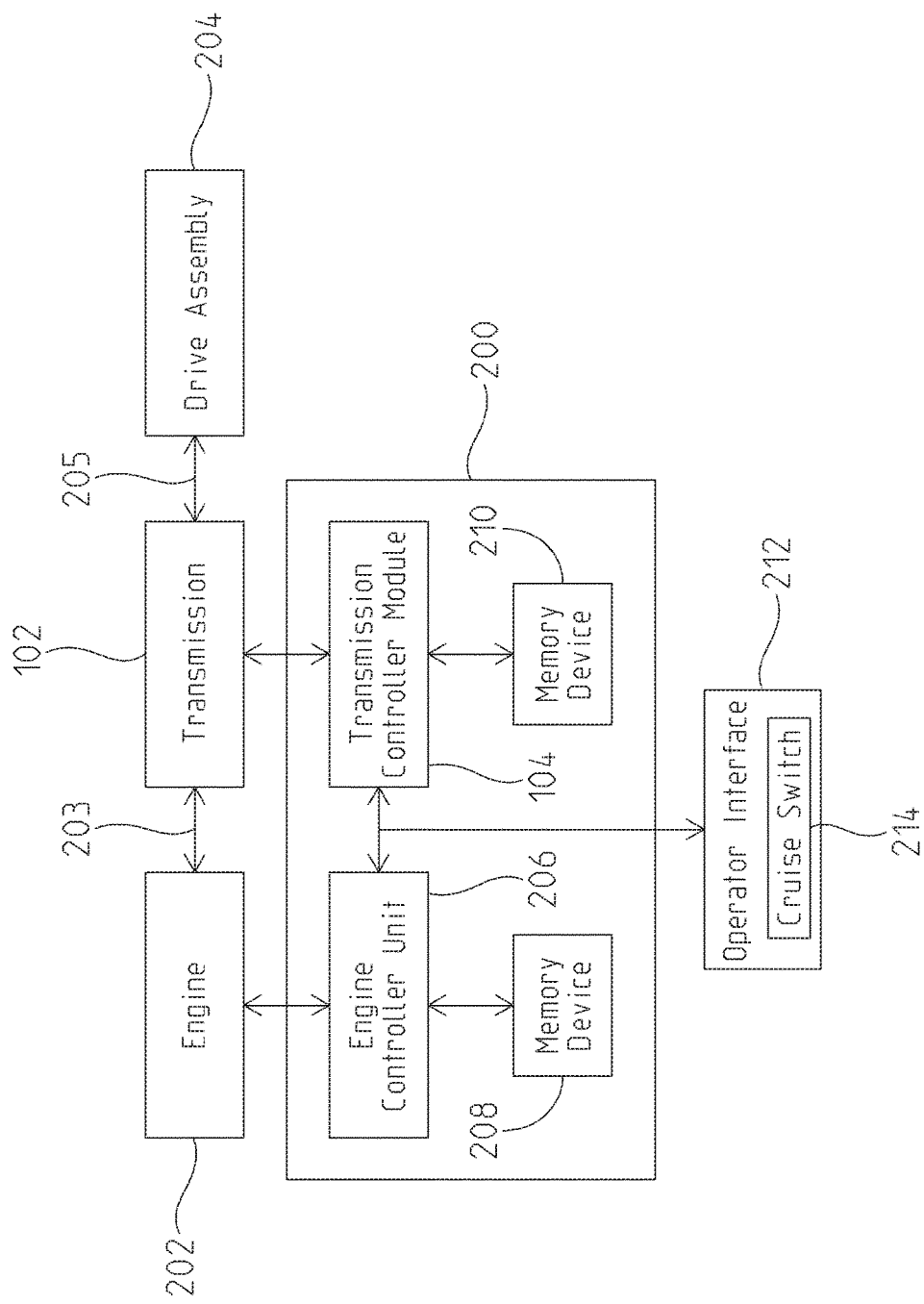
FIG. 2 is a block diagram of a vehicle control system operatively connected to an engine, a transmission, and a drive assembly.

As further illustrated in FIG. 2, the TCM 104 is part of a vehicle control system 200 operatively connected to an engine 202, the transmission 102, and a drive assembly 204. Both the engine 202 and the transmission 102 are coupled to the vehicle control system 200. As described above, the TCM 104 is operatively connected to the transmission 102 through the described sensors and data bus. The engine 202 is operatively connected to an engine controller unit 206, also known as an engine control module (ECM) to control the engine 202. The ECM 206 may be further connected to various sensors of the vehicle that provide the ECM 206 with various operating conditions associated with operation of the engine 202.

The transmission 102, in different embodiments, is configured to provide a torque-speed conversion from the generally higher speed engine 202 to a slower but more forceful output to the drive assembly 204. The drive assembly 204, in different embodiments, includes drive wheels, caterpillar tracks, ground engaging traction devices, etc. that moves the motor vehicle when driven by the engine 202 via the transmission 102. As shown, the engine 202 is coupled to an input shaft 203 of the transmission 102 to provide power to the transmission 102. An output shaft 205 of the transmission 102 is coupled to the drive assembly 204 to provide power to the drive assembly 204.

The ECM 206 and TCM 104, in different embodiments, are implemented using analog and/or digital circuit components. In one embodiment, the ECM 206 and the TCM 104 each include a processor, such as a microcontroller or microprocessor. Furthermore, the ECM 206 and TCM 104 each have one or more associated memory devices 208, 210 configured to store instructions to be respectively executed by the ECM 206 and the TCM 104. The memory devices 208, 210 in different embodiments, include programmable read only memory devices, flash memory device, random access memory devices, and/or other storage devices that store instructions to be executed and data to be processed by the ECM 206 and the TCM 104.

The vehicle includes operator interface 212 which has, in different embodiments, operator controls such as various levers, switches, pedals, buttons, wheels, dials, etc. which an operator of the vehicle uses to control operation of the vehicle. The operator controls may further include various output devices such as needles, digital outputs, displays, etc. that the operator may monitor in order to confirm operation of the vehicle. Specifically, the operator interface 212 includes a cruise control switch 214 to engage and to disengage a cruise control system. The cruise control switch 214, in different embodiments, is a mechanical switch, a touch switch, an electrical switch, or voice activated switch.

The memory device 208, in different embodiments, is programmed to include boot code, application software, and standard calibration parameters to configure the ECM 206, and therefore the engine 202 for a range of operations. For example, in one embodiment, the memory device 208 is programmed with standard calibration parameters to define a hardware characterization for an engine subsystem with a combustion model as a function of boost and fuel injected, to define a communication datalink infrastructure (e.g. protocols supported, message formats, etc.), and to define diagnostic and failure modes. Additionally, the memory device 208, in different embodiments, is programmed with calibration parameters to define anti-abuse algorithms for the engine subsystem, to define fuel to air ratio algorithms, to define emissions control parameters, to define odometer parameters, and to define sensor and actuator parameters (e.g. calibration of oxygen sensor outputs to measurement values).

The memory device 208, in other embodiments, is programmed to provide custom calibration parameters that define torque and horsepower ratings and that define: (i) communication datalink selections (e.g. protocols selected, devices from which to receive messages, etc.); (ii) custom calibration parameters that enable/disable general purpose input/output functions (e.g. the cruise control is ON and only active above the specified road speed); and (iii) engine accessory features (e.g. engine brake, road speed governor, idle shutdown, PTO (power take-off) control, governor type, etc.).

Similarly, the memory device 210, in different embodiments, is programmed to include boot code, application software, and standard calibration parameters to configure the TCM 104 and transmission 102 for a range of applications. Custom calibration parameters, in different embodiments, are stored in the memory device 210 to provide a programmed transmission subsystem provided for a particular application.

In different embodiments, the memory device 210 is programmed with standard calibration parameters to define a hardware characterization of a transmission subsystem (e.g. oil flow as a function of temperature), to define communication datalink infrastructure (protocols supported, message formats, etc.), and to define diagnostic and failure modes. The memory device 210, in different embodiments, is programmed with calibration parameters to define anti-abuse algorithms, to define base values of learning parameters (e.g. pressures and volumes), and to define general purpose input/output function design criteria, to define shift times (e.g. how long to slip clutches), to define sensor and actuator calibration (e.g. correlating a sensor output such as a voltage to a measured value such as temperature).

In additional embodiments, the memory device 210 is programmed to include calibration parameters that define shift schedules (e.g. engine speeds at which to upshift) and to define communication datalink selections (e.g. protocols selected, devices from which to receive messages, etc.), to define general purpose input/output function enables/disables (e.g. output shaft retarder is ON and only active above the specified road speed) and to define enable/disable integrated vehicle functions (e.g. variable modulated main, cab warm-up mode, vehicle acceleration control, etc.)

The ECM 206 and the TCM 104 each execute or otherwise rely upon computer software applications, components, programs, objects, modules, or data structures, etc. Software routines resident in included memory of the ECM 206 and TCM 104, the memory 208 or 210, or other memories, are executed in response to the signals respectively received from the engine 202, the transmission 102, and the operator interface 212. The executed software includes one or more specific applications, components, programs, objects, modules or sequence of instructions typically referred to as "program code". The program code includes one or more instructions located in memory and other storage devices which execute the requests provided by the operator through the operator interface 212, including the cruise control switch 214, as well as engine or transmission operations defined as described above.

Gear selection in a transmission when paired with an engine operating in cruise control mode can be difficult under certain conditions, such as when the grade or slope of the road changes constantly or significantly over a certain distance. Under these conditions, some cruise control systems are configured to select a gear that places the engine at a low speed, or low revolutions per minute (RPM), for fuel efficiency purposes. However, known cruise control systems often respond to the variations in road conditions by adjusting the engine speed about the cruise control set speed with an oscillatory vehicle speed. These oscillations can trigger a large number of engine shifts over a short period of time, especially when trying to operate the engine at a low engine speed. The result is an unacceptable number of gear transitions over a period of time, or an unacceptable frequency of gear shifts, which results in driver annoyance and excessive transmission wear, both of which are to be avoided. What is needed, therefore, is a method and system to reduce the number of gear shifts to reduce driver annoyance and excessive transmission wear, while still having a sufficient number of gear shifts to provide a relatively smooth vehicle speed when operated in a cruise control mode.

Figure 3:
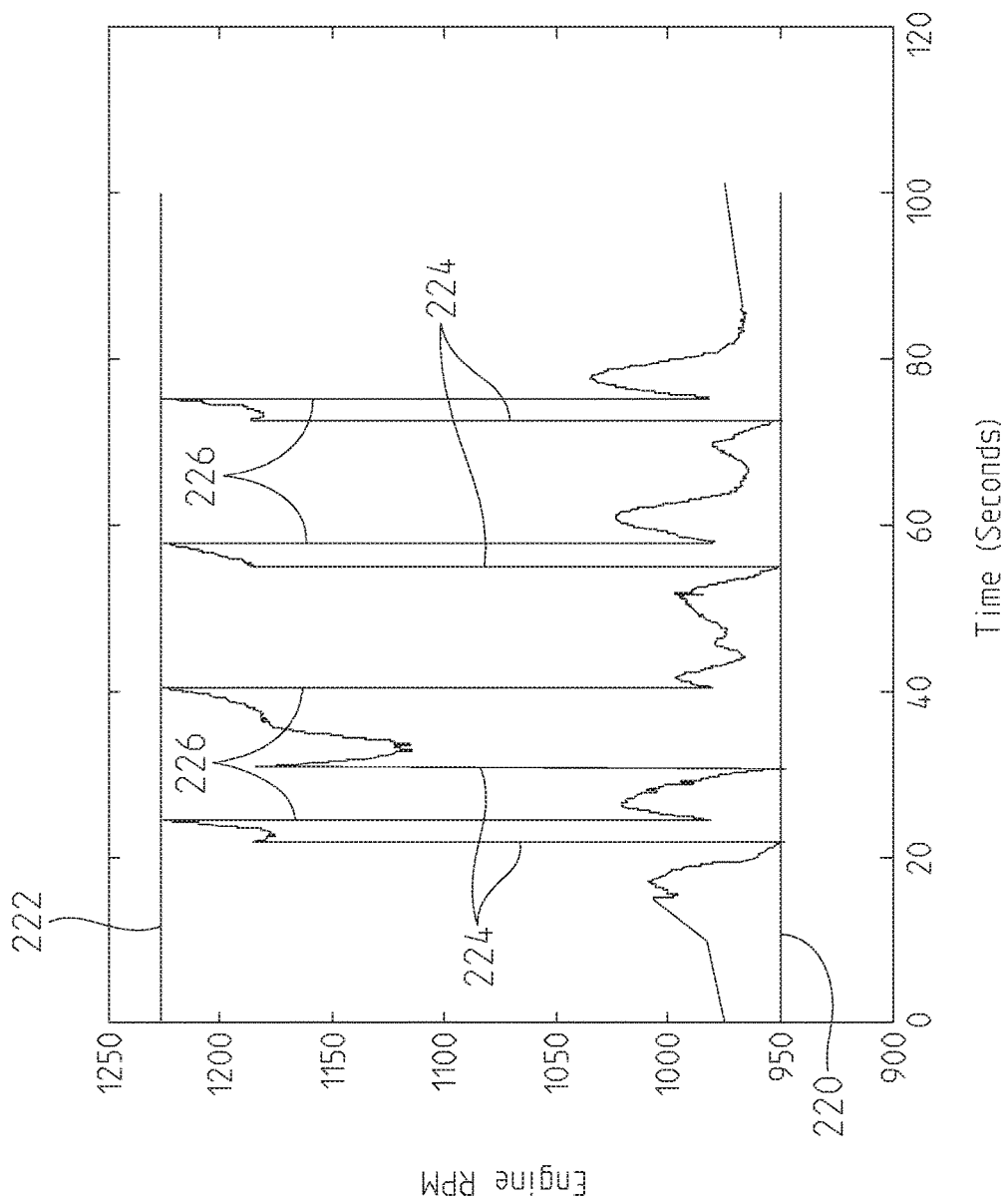
FIG. 3 is a graph of a prior art cruise control system showing engine speed in RPM versus time in seconds.

To illustrate this shortcoming in known cruise control systems, FIG. 3 is a graph of a prior art cruise control system showing engine speed in RPM versus time in seconds. A first horizontal line 220 indicates a downshift speed threshold, the speed at which a downshift occurs to avoid operating the engine in a torque limited mode. Should the engine RPM fall below the downshift speed threshold, a downshift occurs. Consequently, should the engine be operating at a speed greater than 950 RPM, the engine speed is considered to be greater than the downshift speed threshold, and no downshift to a lower gear occurs. In this embodiment, the downshift speed represents the speed of the engine when in an overdrive gear. A horizontal line 222 indicates an upshift speed threshold, the speed at which an upshift is made to a higher gear to reduce the engine speed. If the engine RPM is greater than the RPM value at the line 222, an upshift occurs.

The graph represents a vehicle being operated over a relatively hilly road such that a number of downshifts 224, from a higher gear to a lower gear, occur on every hill climb. The downshifts occur when the engine RPM falls below the line 220, or is less than the downshift speed threshold. Once the downshift occurs and the road begins to either level out or to have a decrease in grade, the engine speed increases, and if sufficiently increased, an upshift 226 occurs to shift the transmission from the lower gear to the higher gear. Once engine speed in the higher gear falls below the line 220, resulting for instance from a hill climb, another downshift occurs. In this example, the number of gear shifts over the time period of about 80 seconds is eight. This number of shifts, not only places excessive wear on the transmission, but also can be a significant annoyance to the vehicle operator, often to the point of distraction.

The present invention provides an improved method and system of reducing transmission wear and tear and driver annoyance. In addition, a fuel savings may result. The present invention determines the actual speed of the vehicle and also determines when the actual speed is less than the cruise set speed. In one embodiment, the vehicle speed is determined by the output speed sensor 130 of the transmission. If the determined actual vehicle speed is less than the cruise set speed and the engine is not torque limited, the difference, or shortfall, with the cruise set speed is determined. The observed shortfall is used to raise a limit, identified as a cruise speed margin or cruise margin herein, the margin at which a downshift from a higher gear to a lower gear occurs. This limit is an upshift engine speed threshold, which is equivalent to the transmission's turbine speed. The frequency of shift cycling between gears is thereby reduced.

Figure 4:
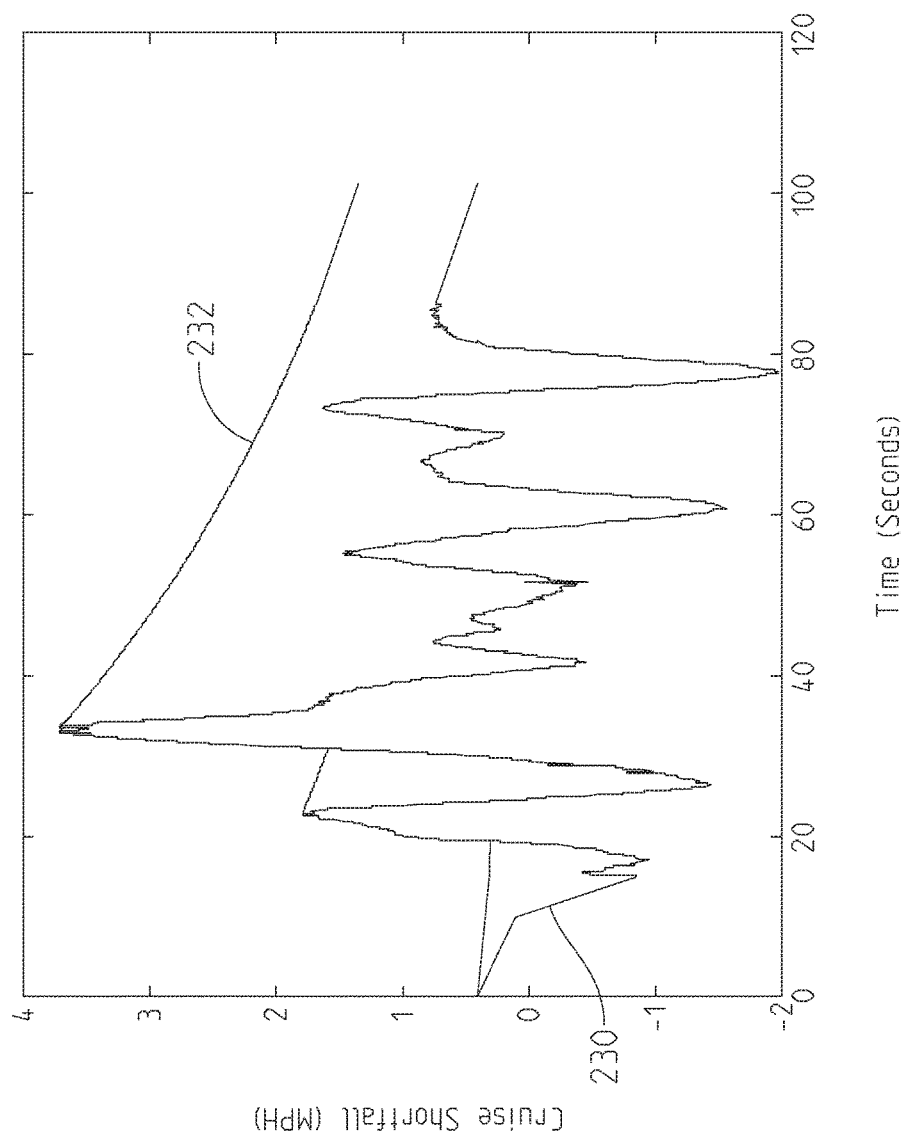
FIG. 4 is a graphical representation of a speed shortfall of a vehicle operating in a cruise control versus time.

A cruise speed shortfall 230, illustrated as miles per hour (MPH) in FIG. 4, is determined and stored in a memory device, such as the memory device 210. The cruise shortfall 230 is determined as a difference between the vehicle cruise set speed, which is illustrated as a cruise shortfall of zero, and the actual vehicle speed. In different embodiments, the vehicle cruise set speed and the vehicle speed are determined based on one or more of a sensed engine speed, a sensed speed of the transmission turbine, or by other mechanisms, to determine the cruise shortfall. In one embodiment, for instance, the turbine speed monitored by the sensor 130 is converted by the TCM 104 to a signal to be compared to the cruise control set speed. The cruise shortfall is a positive value when the actual vehicle speed falls below the cruise set speed. The value of the cruise shortfall is used to determine a cruise margin 232, as illustrated in FIG. 4. The cruise margin 232 is used to decide at what vehicle speed a gear shift occurs. The cruise margin of FIG. 4 is provided as one example to illustrate a vehicle driving under certain road conditions. An actual determined cruise margin, however, is determined by the TCM 104 under a wide variety of road conditions, vehicle speeds, and vehicle system conditions, including engine size and transmission configurations. The updated and calculated cruise margin in the described embodiments, is used in place of the upshift speed threshold 222 illustrated in FIG. 3 of the prior art to reduce the number of gear shifts occurring when the vehicle travels over varied road conditions, such as a road or terrain that includes hills and valleys.

Figure 5:
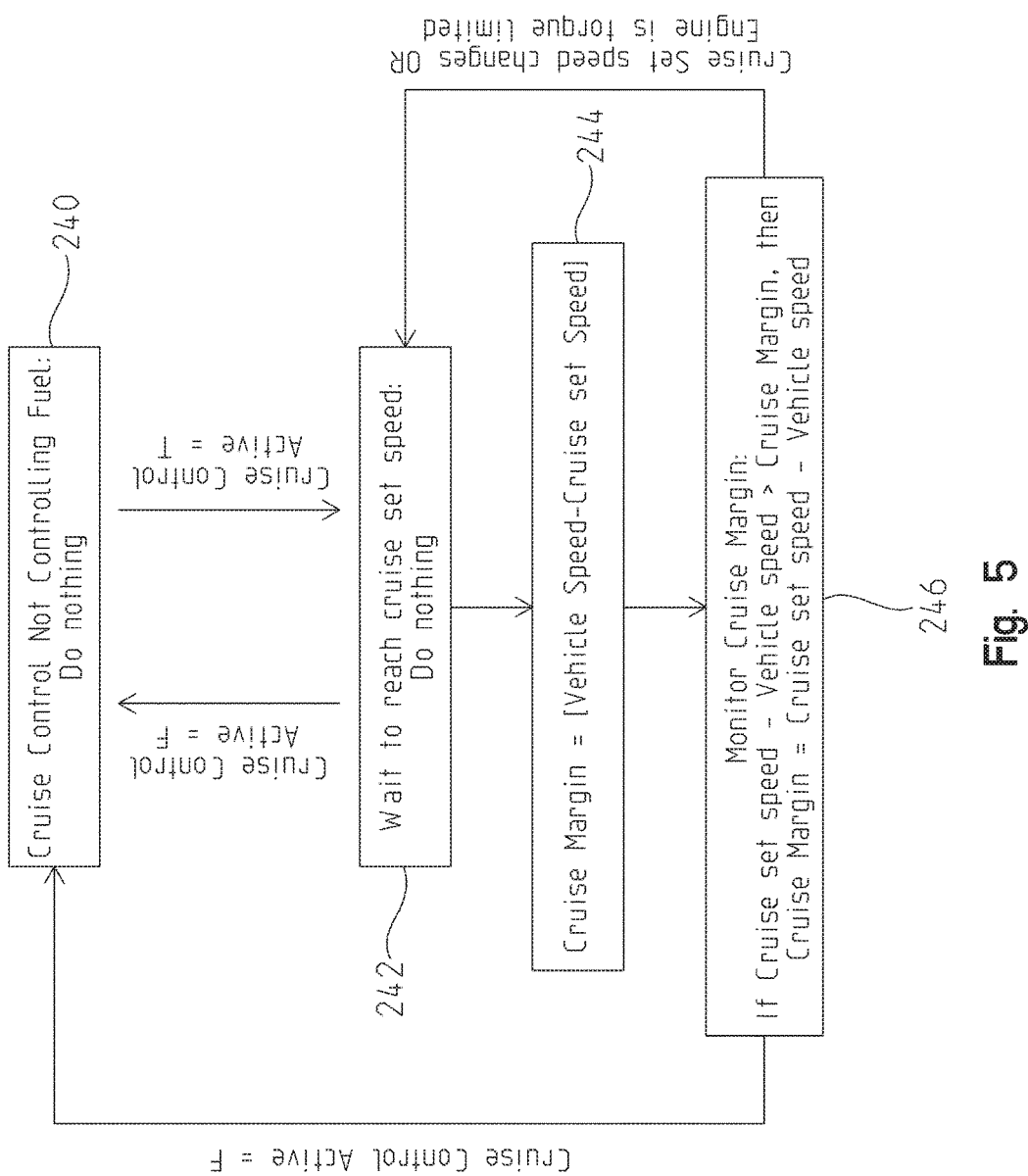
FIG. 5 is a state diagram of one embodiment of a cruise control system of the present disclosure.

FIG. 5 illustrates a state diagram of one embodiment of the operating states of the cruise control system as configured with the transmission 102, the TCM 104 and the memory device 210. At block 240, the state of the cruise control speed switch 214 of FIG. 2 is determined. If the vehicle is not operating in a cruise control mode, then no further operations are performed. As long as the cruise control system is not active, here identified as "F" (false), the state of the cruise control switch 214 is monitored, but no other cruise control features are employed. If, however, the state of the cruise control switch 214 indicates that the vehicle is operating in cruise control mode (cruise control is active, here identified as "T" (true), then the control hardware and/or software proceeds to determine whether the vehicle speed is at the cruise control set speed as shown in block 242. If the vehicle speed has not reached vehicle cruise speed, then no further action is taken is taken at block 242. Once the vehicle speed reaches the cruise control set speed, the vehicle speed is determined and compared to the cruise control set speed at block 244.

The comparison between the vehicle speed and cruise control set speed is determined as the absolute value of the difference between the actual vehicle speed and the cruise set speed. This absolute value result is called the cruise margin, which is illustrated in FIG. 4 as the cruise shortfall 230. When the vehicle speed falls below the cruise set speed, the difference is used to generate a cruise margin value which is continuously updated by resetting the cruise margin value to a new value as determined: 1) from a comparison of the cruise error to a current cruise margin value or 2) as a reduction in the value of the cruise margin over time.

As stated at block 246, the cruise error which is continuously updated at block 244 is monitored and compared to the cruise margin. If the cruise set speed minus the vehicle speed is greater than the cruise margin, then the cruise margin is set equal to the cruise set speed minus the vehicle speed. If however, the cruise set speed minus the vehicle speed is not greater than the cruise set speed, the cruise margin is continuously reduced over a period of time.

In one embodiment, the cruise margin is converted to a translated engine speed margin as determined by the TCM 104, or another vehicle controller, using programmed characteristics of the vehicle including gear relationships of the tires, axle, and transmission. The translated engine speed margin is used by the vehicle control systems to determine when a gear shift is to be made from a lower gear, having a higher RPM, to a higher gear, having a lower RPM. One example of the cruise margin is illustrated in FIG. 4 as line 232. As long as the engine is not operating at the engine's steady state torque limit and the cruise set speed does not change, the vehicle speed continues to be monitored relative to the cruise set speed. At the same time, the value of the cruise margin is continuously reduced over a period of time unless the cruise set speed minus the vehicle speed is greater than the cruise margin. If the cruise set speed minus the vehicle speed is greater than the cruise margin, then the cruise margin is reset to a new value. Whenever the difference between the cruise margin and vehicle speed is greater than the stored current speed margin, the speed margin is updated with the difference. If, however, the vehicle speed does not exceed the cruise margin, then the value of the speed margin returns to zero. In this way the speed margin is a measure of the maximum variation seen over a desired time interval.

Figure 6:
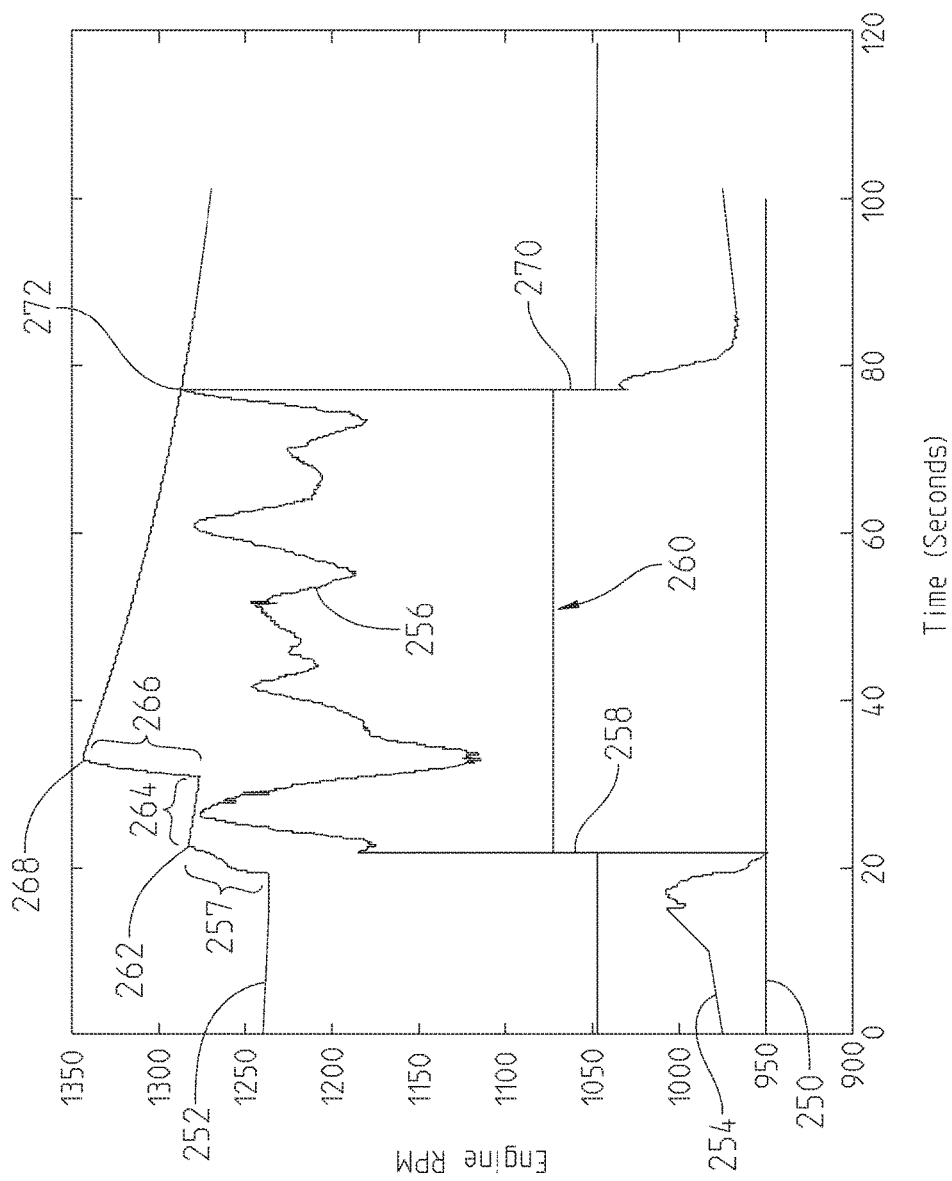
FIG. 6 is a graphical representation of gear changes of a transmission over time using the vehicle speed control method of the present disclosure.

FIG. 6 illustrates a graph of engine RPM versus time and a reduced number of gear changes in a vehicle using the disclosed method and system for minimizing shift cycling during low speed engine operation with cruise control. As seen in FIG. 6, a horizontal line 250 represents a downshift speed threshold having an engine speed of 950 RPM. If the engine speed falls below, or is less than, the downshift speed threshold, a downshift is made by the transmission from a higher gear to a lower gear to raise engine RPM. A cruise margin line 252 represents the cruise margin which varies over time. A first engine speed 254 represents the engine speed, while the transmission is an overdrive gear for example. A second engine speed 256 represents the engine speed while the transmission is in a direct drive gear, for example. Generally, however, the engine speed 254 indicates a transmission being in a gear higher than the gear represented by the engine speed 256.

As illustrated in FIG. 6, the cruise margin 252 is set to a value at time zero representing an engine speed of between 1200 and 1250 RPM and gradually decreases over time until about 20 seconds. In the embodiment of FIG. 6, only an exemplary portion of the engine RPM is shown and as such does not shown initialization of the cruise margin value.

In one embodiment, the initial value of the cruise margin is set to zero. In other embodiments, the initial value of the cruise margin value is set to a predetermined value other than zero. Looking at the engine speed occurring over time before the apparent decrease in engine speed at about 20 seconds, the vehicle is operating in the overdrive gear and begins to climb a hill, for instance. At about 15 seconds engine speed begins to drop. During the period of time of about 15 seconds to 20 seconds, as the engine speed is dropping, the cruise error, the difference between the cruise set speed and the actual vehicle speed, is continually updated. At the same time, the cruise margin 252 is continuously updated and increases, since the absolute value of the difference between cruise set speed and vehicle speed is being determined and continuously updated, as seen at the portion 257. At about 20 seconds, the vehicle speed falls below the downshift threshold 250, at which time a downshift occurs as shown at a location 258 of a shift line 260. Once a shift to the lower gear occurs, the vehicle speed and the engine speed begins to increase and the transmission operates in a lower gear at a higher RPM as shown by line 256. Once the vehicle speed begins to increase, the cruise margin is continually updated as shown at the portion 257 until the value of the cruise margin is established at a first high value 262, the point at which the cruise margin begins to decrease over time, as shown at the portion 264. During this period of time, approximately between 20 and 30 seconds, the vehicle speed 256 begins to fall, but not sufficiently to reset the cruise margin to a new value as determined at block 246 of FIG. 5. As the vehicle speed 256 continues to fall at about 30 seconds, however, the value of the cruise set speed minus the vehicle speed becomes greater than the cruise margin and the cruise margin is continuously updated and determined as the result of the cruise set speed minus the vehicle speed as shown at the portion 266. Eventually, the value of the cruise set speed minus the vehicle speed is not greater than the cruise margin and a value of the cruise margin 252 is established at the second high value 268.

Proceeding forward in time from the second high point 268, the cruise margin 252 decreases over time until about 75 seconds, at which point a gear shift occurs at a location 270. The transition from a lower gear to a higher gear, to reduce the engine RPM, is made when the engine RPM value at location 272 is greater than the cruise margin 252. Since the gear shift takes place when the engine speed 256 is greater than the cruise margin 252, the shift from the lower gear to the higher gear is made at the time at which; 1) the engine speed is greater than the cruise margin 252 and 2) the upshift would not torque limit the transmission. Consequently, an upshift to a higher gear from a lower gear does not occur until the engine speed in the lower gear is greater than the downshift speed threshold by the cruise margin, which is converted to the translated engine speed margin to make the comparison as previously described. The updated cruise margin 252, therefore is continuously updated to indicate one or more of the following: 1) when a shift is made from a higher gear to a lower gear; 2) when the cruise set speed minus the vehicle speed is greater than cruise margin, and 3) continuously reduced over time if the cruise set speed minus the vehicle is not greater than the cruise margin. The conditions under which an upshift takes place is continuously modified, or continuously updated, over a period of time. With the continuously updated cruise margin, the vehicle operates at a wider variety of different speeds around the cruise control set speed when compared to the speeds of a known cruise control. The reduction in gear shifts provides for increased operator satisfaction, reduces engine wear and tear, and reduces fuel consumption.

The cruise margin, if not updated from the comparison of cruise set speed to vehicle speed, decreases over time. In one embodiment, the decrease is determined as a function of an exponential decay algorithm resident in one or more memories of the vehicle control system and determined by one or more of the controller modules, such as the TCM 104. The amount of decay, in different embodiments, results from a predetermined exponential decay constant. In other embodiments, the decrease of the cruise margin over time is determined using a step function. In still other embodiments, other functions of decreasing the value of the cruise margin over time are used, such as piecewise functions. In addition, in other embodiments, the decreasing value of the cruise margin over time is different for different gear changes. For instance the decreasing function over time in a first gear is different that the decreasing function overt time in a second gear.

As described herein, in one embodiment, a variable cruise control set speed algorithm adjusts the selection of gears by the transmission during a cruise control operation. As such, the algorithm begins operation when cruise control becomes active. Cruise control active means that the cruise control algorithm is determining the fuel rate delivered to the engine, as opposed to the operator using the accelerator pedal to control vehicle speed. Initially the algorithm waits for the vehicle to achieve the desired speed which is established by the cruise control system operating according to cruise set speed. Achieving the desired set speed is defined as the measured vehicle speed being within a specified amount of the cruise set speed. Once cruise control is active, the cruise speed deficiency is characterized. Cruise speed deficiency means the amount that measured vehicle speed falls below the cruise set speed. The deficiency can be determined by methods comparing the vehicle speed to the cruise set speed, and includes determining the speed difference at the output of the transmission or using determined vehicle speeds, such that a drop in vehicle speed is determined. While cruise control is active, the controller logic to bring about a transmission upshift is adjusted to assure that an upshift is not made if the likely drop in vehicle speed would result in a downshift. The control system generates an updated speed margin by increasing the vehicle speed at which the upshift is made determined by the likely cruise speed deficiency.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A vehicle speed control method for controlling a speed of a vehicle including a cruise control system and an engine developing an engine torque to drive a transmission having a plurality of gears, wherein the transmission is configured to upshift from a lower gear to a higher gear having a lower RPM than an RPM of the lower gear, is configured to downshift from the higher gear to the lower gear having a higher RPM than the RPM of the higher gear, and is configured to move the vehicle in response to the engine torque, the method comprising:
   identifying a cruise set speed maintained by the cruise control system;
   identifying when the vehicle speed is less than the cruise set speed;
   determining a cruise margin from a comparison of the identified vehicle speed to the identified cruise set speed; and
   modifying the cruise margin over a period of time by continuously increasing the cruise margin until the vehicle speed falls below a downshift speed threshold.

2. The vehicle speed control method of claim 1 wherein the modifying the cruise margin includes increasing the cruise margin when the difference between the cruise set speed and the vehicle speed is greater than the modified cruise margin.

3. The vehicle speed control method of claim 2 wherein the modifying the cruise margin includes decreasing the modified cruise margin over time.

4. The vehicle speed control method of claim 3 wherein the decreasing the modified cruise margin over time includes continuously decreasing the cruise margin over time until the modified cruise margin reaches one of i) a predetermined value and ii) the cruise set speed minus the vehicle speed is greater than the modified cruise margin.

5. The vehicle speed control method of claim 4 further including increasing the modified cruise margin if the vehicle speed is greater than the modified cruise margin and the engine of the vehicle is not torque limited.

6. The vehicle speed control method of claim 5 further including downshifting from the higher gear to the lower gear if the vehicle speed in the higher gear falls below the downshift speed threshold.

7. The vehicle speed control method of claim 6 further including upshifting from the lower gear to the higher gear if the vehicle speed is greater than the modified cruise margin.

8. The vehicle speed control method of claim 3 wherein the decreasing the modified cruise margin over time includes decreasing a value of the modified cruise margin over time until the decreasing modified cruise margin reaches a predetermined value.

9. The vehicle speed control method of claim 8 includes determining the predetermined value prior to the identifying step of identifying the cruise set speed maintained by the cruise control system.

10. The vehicle speed control method of claim 8 includes determining the predetermined value once the vehicle is operating with the cruise set speed established by the cruise control system.

11. A vehicle control system configured to control a vehicle speed of a vehicle including a cruise control system configured to provide a cruise set speed, an engine developing an engine torque to drive a transmission having a plurality of gears, wherein the transmission is configured to upshift from a lower gear to a higher gear having a lower RPM than an RPM of the lower gear, is configured to downshift from the higher gear to the lower gear having a higher RPM than the RPM of the higher gear, and is configured to move the vehicle in response to the engine torque, the vehicle control system including:
   a memory device configured to store program instructions; and
   a vehicle system control module operably connected to the transmission and to the memory device, the vehicle system control module configured to execute the stored program instructions to:
      identify a cruise set speed maintained by the cruise control system;
      identify when the vehicle speed is less than the cruise set speed;
      determine a cruise margin from a comparison of the vehicle speed to the cruise set speed; and
      modify the cruise margin over a period of time by continuously increasing the cruise margin until the vehicle speed falls below a downshift speed threshold.

12. The vehicle control system of claim 11 wherein the vehicle system control module is configured to execute the stored program instructions to:
   increase the cruise margin when the difference between the cruise set speed and the vehicle speed is greater than the modified cruise margin.

13. The vehicle control system of claim 12 wherein the vehicle system control module is configured to execute the stored program instructions to:
   modify the cruise margin by decreasing the modified cruise margin over time.

14. The vehicle control system of claim 13 wherein the vehicle system control module is configured to execute the stored program instructions to:
   increase the cruise margin if the vehicle speed is greater than the modified cruise margin and the engine of the vehicle is not torque limited.

15. The vehicle control system of claim 14 wherein the vehicle system control module is configured to execute the stored program instructions to:
   downshift from the higher gear to the lower gear if the vehicle speed in the higher gear falls below the downshift speed threshold.

16. The vehicle control system of claim 15 wherein the vehicle system control module is configured to execute the stored program instructions to:
   upshift from the lower gear to the higher gear if the vehicle speed is greater than the modified cruise margin.

17. The vehicle control system of claim 13 wherein the vehicle system control module is configured to execute the stored program instructions to:
   decrease a value of the modified cruise margin over time until the decreasing modified cruise margin reaches a predetermined value.

18. The vehicle control system of claim 17 wherein the vehicle system control module is configured to execute the stored program instructions to:
   determine the predetermined value prior to identifying the cruise set speed maintained by the cruise control system.

19. The vehicle control system of claim 17 wherein the vehicle system control module is configured to execute the stored program instructions to:

determine the predetermined value after identifying the cruise set speed maintained by the cruise control system.

\* \* \* \* \*